Figure 1:
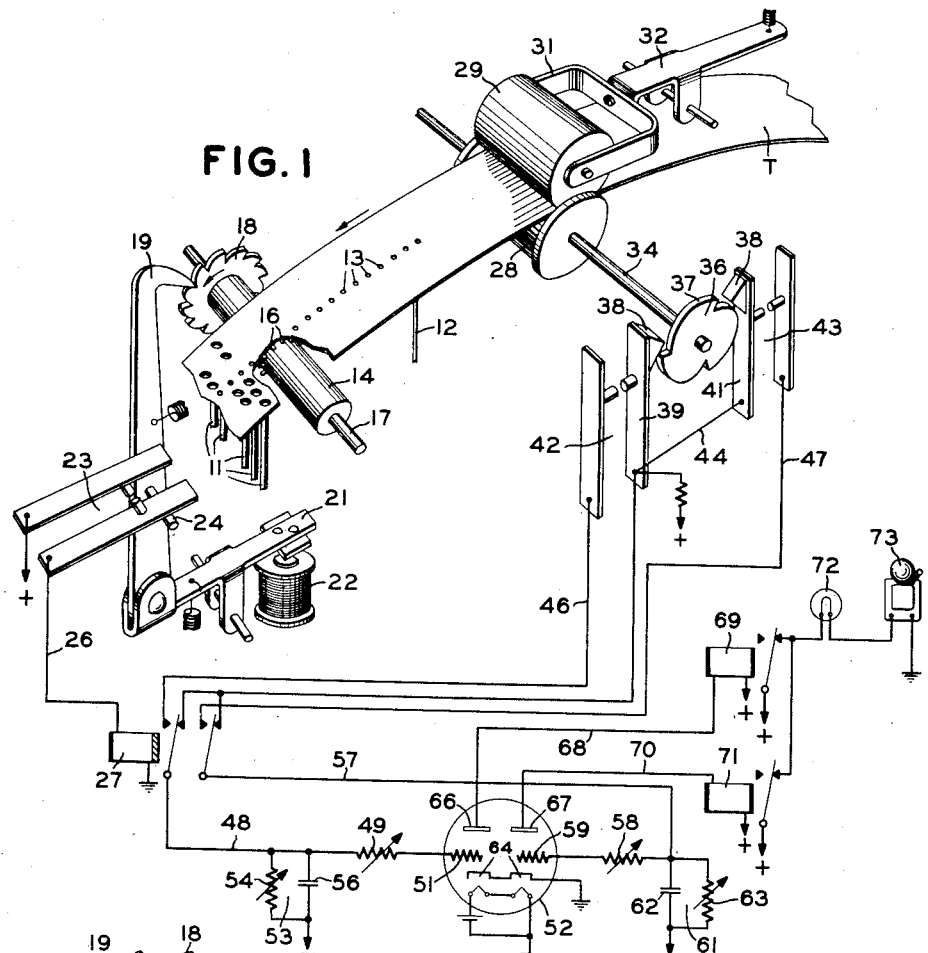

Jan. 3, 1939. J. N. ANDERSON ET AL 2,142,880

TAPE TIE-UP INDICATING MEANS

Filed Dec. 15, 1937

INVENTORS
J. N. ANDERSON
R. STEENECK
BY M. R. Marsh
ATTORNEY

Patented Jan. 3, 1939

2,142,880

UNITED STATES PATENT OFFICE 2,142,880

TAPE TIE-UP INDICATING MEANS

James N. Anderson, North Plainfield, N. J., and Robert Steeneck, New York, N. Y., assignors to The Western Union Telegraph Company, New York, N. Y., a corporation of New York Application December 15, 1937, Serial No. 179,828

8 Claims. (Cl. 177—311)

This invention relates primarily to telegraph machines and more particularly to attachments for telegraph machines, such as transmitters and receivers that employ a tape which is normally sequentially advanced concomitantly with each operation thereof.

In telegraph machines and particularly in reperforators of the present day type wherein the recording tape is definitely stopped and started several hundred times a minute, so that the reperforator may properly perforate the tape in accordance with the received signals, the feed holes in the tape are subjected to considerable strain. The tape after being perforated is normally used to control the operation of a transmitter to transmit signals in accordance with the perforations therein, and therefore definite spacing of the code perforations in the tape is necessary. The tape is normally advanced through the reperforator by means of an intermittently rotatable tape feed wheel engaging a row of feed holes, punched as a concomitant of the perforating operation. As the tape is normally used but once and then destroyed, it is desirable to have the tape as thin as possible because of such factors as the cost of the tape, the amount that can be handled in a roll of convenient size, etc. However, with a comparatively thin tape any abnormal drag or hindrance to the passage of the tape through the machine is likely to cause the feed holes to be ripped out of the tape by the feed wheel. Obviously, during such a condition the tape will not be properly advanced through the machine and if the feed holes are once ripped out, all the signals received thereafter will be improperly recorded or lost. Unless the attendant happens to be closely watching the machine, the improper operation of the tape advancing means is apt not to be immediately apparent and consequently results in a considerable number of lost signals. Obviously, a break in tape or an exhausted supply would produce the same general condition and result in lost signals.

It is, therefore, an object of this invention to provide an improved attachment for telegraph machines employing a tape normally advanced with each operation of the machine for controlling a signalling or alarm device for indicating the failure of the tape advancing means to properly advance the tape.

Another object of the invention is to provide a mechanism of the above nature which is operated solely by the tape.

A still further object of the invention resides in the simplicity and reliability of the mechanism employed to accomplish the above object.

This invention, in one embodiment thereof, contemplates the employment of a single space discharge device such as a vacuum tube having two independent sets of plate-cathode and grid-cathode circuits which, during normal operation of the tape advancing mechanism of the associated telegraph machine, are maintained in an operated condition by means of two associated contacts which alternately apply positive potential to the grids or control electrodes of their associated circuits. The contacts are alternately caused to be actuated by movement of the tape through the telegraph machine. In an operated condition of the plate-cathode circuits of the vacuum tube, associated relays are maintained in an operated condition. Either one or both of the relays in turn control an alarm, such as a bell and/or lamp, which is adapted to operate with either one or both of the relays in an unoperated condition. When the tape advancing mechanism fails to advance the tape after a predetermined number of operations thereof, one or both of the above mentioned contacts will not be actuated and a negative charge is allowed to leak around a condenser and a resistance to place one or both of the grids or control electrodes of the vacuum tube in a negative condition. This stops the flow of the plate current whereupon one or both of the alarm relays causes the alarm to operate. A means comprising a slow-release relay normally maintained in an operated condition by the normal operation of the tape advancing means, maintains the vacuum tube in operated condition during the cessation of the operation of the tape advancing means for abnormal periods.

A modification of the invention contemplates the employment of two separate vacuum tubes which are normally maintained in an unoperated condition during normal operation of the tape advancing mechanism to advance the tape, one or both of which assume an operated condition on the failure of the tape advancing mechanism to advance the tape whereupon an alarm circuit is completed.

Figure 2:
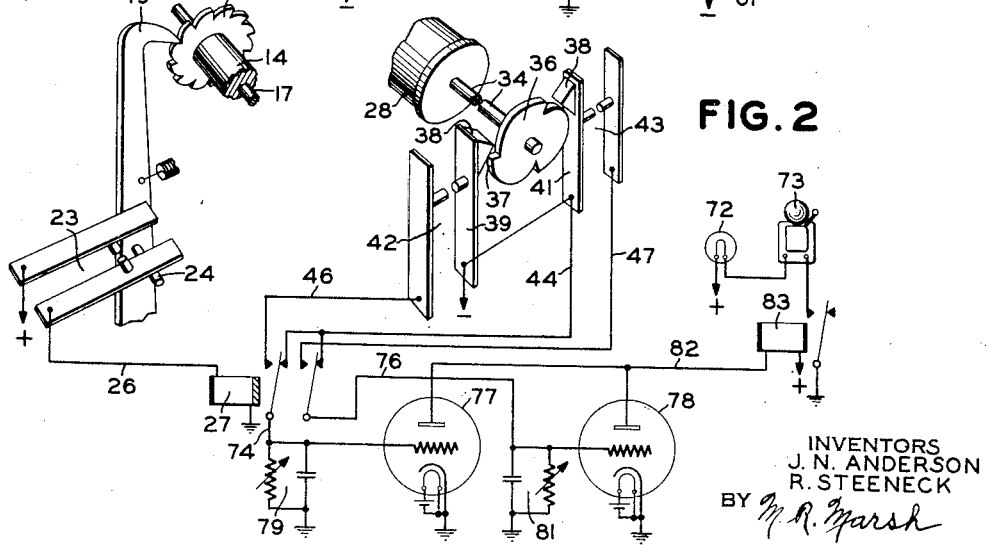

A more complete and thorough understanding of the invention will be had from the following detailed description when taken in conjunction with the accompanying drawing, in the latter of which:

Fig. 1 is a diagrammatic illustration of the circuits and control elements of the preferred embodiment of the invention and the manner in which they cooperate with the tape and tape advancing mechanism of a telegraph machine such as a reperforator; and Fig. 2 is a diagrammatic illustration of the circuits and control elements of a modification of the invention in which two separate vacuum tubes normally maintained in an unoperated condition are employed.

Referring first to Fig. 1, the preferred embodiment of the invention is shown cooperating with parts of a telegraph machine, such as a reperforator, only such parts of the reperforator being shown as are thought necessary for a complete understanding of the invention. As is well known in the art, the reperforator comprises a series of punch pins, such as 11, which are adapted to be selectively operated in accordance with received signals to perforate holes in the tape T. Adapted to be invariably operated on each perforating operation is a feed hole punch pin 12 which forms feed holes 13 in the tape T, and adapted to cooperate with the holes 13 in the tape T is a feed wheel 14 which has a row of radially extending pins 16 normally engaged with the feed holes 13. The feed wheel 14 is affixed to a rod 17 for rotation therewith and also affixed to the rod 17 is a ratchet wheel 18. Cooperating with the ratchet 18 is a pawl 19 which is adapted to be operated once concomitantly with each perforating operation. As shown, the pawl 19 is adapted to be operated by the armature 21 of a magnet 22 although the pawl may be operated from a cam on a rotating shaft of the reperforator as is the condition with many reperforators or any element that may operate on a tape feed operation. A contact 23 is adapted to be closed each time the pawl 19 operates by some means, such as the pin 24 extending horizontally from the pawl 19. Potential is applied to one of the springs of the contact 23 and the other is connected by a conductor 26 to the coil of a slow-to-release relay 27, the other side of which is grounded. During normal operation of the reperforator, the contact 23 is regularly closed and the relay 27 maintained in an operated position with its two tongues against their left hand or make stops. When the reperforator stops operation for a period of time greater than the time required to receive several complete signals, the relay 27 releases its tongues, whereupon they return to their right hand or break contacts. The purpose of the tongues of relay 27 is to prevent the operation of the alarm device when the reperforator ceases operation for the time being, as will be apparent hereinafter.

As illustrated in Fig. 1, preferably located ahead of the feed wheel punch pin 12 relative to the direction of movement of the tape T is a roller 28. The tape passes over the roller 28 and is frictionally held in engagement therewith by a pressure roller 29 pivotally supported for universal movement by means of a yoke 31 and a lever 32. The roller 28 is fixed for rotation therewith to a shaft 34 suitably pivoted in or adjacent the reperforator and also fixed to the shaft 34 for rotation therewith is a disc cam 36. As illustrated, this cam has three projections 37 thereupon which cooperate with pieces of insulating material 38 on springs 39 and 41 located on opposite edges of the cam 36. The springs 39 and 41 comprise the movable elements of associated contacts 42 and 43. The springs 39 and 41 normally tend to move toward the cam and thereby open their associated contacts 42 and 43, and they are connected together in parallel by a conductor 44 to positive potential and to the break stops of the relay 27. The substantially stationary members of contacts 42 and 43 are connected by conductors 46 and 47 respectively to the make stops of the relay 27. The left hand tongue of the relay 27 is connected by a conductor 48 through a variable resistance 49 to a control electrode or grid 51 at the left hand side of a double circuit space discharge device such as a thermionic vacuum tube 52. A grid leak 53 comprising a variable resistance 54 and a condenser 56 connected to negative potential are also connected to the grid 51 through the resistance 49. Similarly, the right hand tongue of relay 27 is connected by a conductor 57 through a variable resistance 58 to another control electrode or grid 59 of the vacuum tube 52. A grid leak 61 comprising a condenser 62 and a variable resistance 63 connected to negative potential is also connected through the resistance 58 to the grid 59. The two cathodes 64 of the tube are grounded and the plates 66 and 67 are connected by individual conductors 68 and 70 through the coils of associated alarm relays 69 and 71 respectively to positive potential. Each of the plate-cathode circuits of the tube 52 comprising the plates 66 and 67 are controlled by their associated control electrodes or grids 51 and 59 respectively and are independent of one another. The tongues of the relays 69 and 71 and the break or right hand stops thereof control the circuit to an alarm device such as a signal lamp 72 and/or a bell 73 in such a way that the circuit to the alarm device is completed when either one or both of the relays 69 and 71 are in an unoperated condition. As illustrated, both the lamp 69 and the bell 71 are employed, although the alarm may consist of either used separately or the relays 69 and 71 may control the circuit to another relay which may cause some other function to be performed such as stopping the reperforator, etc.

The operation of the apparatus will now be described. Let it be assumed that signals are being received on the reperforator at some predetermined speed of operation, under which condition the pawl 19 is successively operated to close the contact 23 on each operation thereof, and as hereinbefore described maintain the relay 27 in an operated condition with its tongues on their make contacts. As the ratchet wheel 18 operates in conjunction with each signal combination, the feed wheel 14 will be rotated or stepped a predetermined amount for each operation of the pawl 19. This will cause the tape T to be advanced to place a clean section thereof in register with the code punch pins 11 and the feed hole punch pin 12 whereupon in conjunction with the next received combination, the pins 11 will be selectively actuated and the feed hole pin 12 invariably actuated. Under normal conditions as the tape advances the roller 28 in frictional engagement therewith is caused to be intermittently rotated and in turn causes the shaft 34 and the cam 36 to rotate. As the cam 36 rotates, the projections 37 successively engage the pieces of insulating material 38 and alternately closes and allows to open first one and then the other of the contacts 42 and 43. The projections 37 on the cam 36 are so arranged that both of the contacts 42 and 43 cannot be closed at the same time. As one of the contacts such as 42 closes, positive potential is applied over conductor 46, through the make stop and left hand tongue of relay 27, over conductor 48 and through the variable resistance 49 to the grid 51 of the vacuum tube 52. Part of this positive potential also flows into the grid leak 53 to charge the upper side of the condenser 56 positively. With positive potential on one of the grids, such as 51 of the vacuum tube 52, current is allowed to flow through one of the alarm relays, such as 69, over the conductor 68 to the plate 66 and through the tube 52 to the grounded cathode 64. This flow of current maintains the relay 69 in an operated condition. In a similar manner the closing of the other contact 43 causes positive potential to be applied to the grid 59 of the tube 52 and causes the alarm relay 71 to be maintained in an operated condition, and with both the alarm relays 69 and 71 in an operated condition, the circuits to the alarm devices 72 and 73 are maintained in an uncompleted condition.

Under normal operating speed of the reperforator the tape T is advanced at such a rate as to cause the contacts 42 and 43 to be sequentially reclosed before the positive charge on the condensers 56 and 62, respectively, can all be dissipated into the tube 52 or leak around the variable resistances 54 and 63, respectively. Thus for the normal operation of the reperforator both of the plate-cathode circuits of the vacuum tube 52 are maintained in an operating condition and the alarm inoperative.

Let it be assumed that the tape advancing mechanism of the reperforator fails to advance the tape T or cause the roller 28 and the cam 36 to rotate. In this condition at least one of the contacts 42 or 43 will be open and positive potential will not be applied to its associated grid such as 51 or its associated condenser such as 56 in the grid leak 53. The positive charge that was on the condenser 56 in the grid leak 63 due to the previous closure of the contact 42 will be partially dissipated into the vacuum tube 52 while the rest leaks around the condenser 54 and at the same time allowing the grid 51 to become neutral or be negative by bias due to current from the grid leak 53. This stops the flow of positive potential in its associated plate-cathode circuit and causes the associated alarm relay to become unoperated. This in turn causes the alarm device to operate which calls to the attention of the attendant that something is amiss, whereupon he proceeds to correct the condition. Obviously, the failure of the roller 28 to rotate may be due to any one of several causes, such as a break in the tape, an exhausted supply or the feed holes 13 cooperating with the feed pins 16 being ripped out.

To prevent the operation of the alarm device when the reperforator stops for the time being, the slow-to-release relay 27 is employed. This relay becomes deenergized when the contact 23 is not closed within predetermined intervals and allows the tongues of the relay 27 to make contact with their break stops and thereby short out contacts 42 and 43 and apply positive potential to the grids 51 and 59 of the vacuum tube 52. This condition, as hereinbefore described, maintains the alarm relays 69 and 71 in an operated condition and the circuits to the alarm devices in an uncompleted condition. Obviously the time of release of the relay 27 should be less than the time required for a positive charge to leak off one of the grids 51 or 59, otherwise the alarm might operate when the reperforator ceased operating for short intervals of time.

It has been found that with a variable resistance of approximately ten megohms and a capacity of approximately two microfarads in the grid leaks such as 53 and a variable resistance 49 of from one-fourth to one-half megohm in the grid circuit, the time required for the associated plate-cathode circuit to become discontinued after the opening of the contact 42 is about three seconds, and obviously varying the resistances 49 and 54 changes this time.

From the above it is evident that the failure of the tape to be advanced after a predetermined number of operations of the perforator will cause the alarm to operate.

Fig. 2 shows a modification of the invention in which two separate vacuum tubes are normally maintained in an unoperated condition to keep the alarm device unoperated although a single double circuit tube could equally well be employed as in the preferred embodiment, the essential difference being that in this embodiment the plate-cathode tube circuits are normally maintained in an unoperated condition.

In the preferred and modified embodiments of the invention the contacts, relays, alarms, conductors, and operating members of the reperforator which are common to both embodiments are given similar reference numerals. As shown in Fig. 2, the movable members of the contacts 42 and 43 are connected in parallel to negative potential and by conductor 44 to the break stops of the relay 27. The tongues of relay 27 are connected by individual conductors 74 and 76 to the control electrodes or grids of associated thermionic vacuum tubes 77 and 78 respectively. Also connected to the grids of these tubes are grounded grid leaks 79 and 81. The plates of the tubes are connected in parallel by a conductor 82 through the coil of a single alarm relay 83 to positive potential. The tongue of the alarm relay 83 is gounded and the make stop thereof is connected through alarm devices, such as 72 and 73, to a source of potential. Under normal operation with the tape advancing, to rotate the roller 28 and cam 36 for each operation of the reperforator and with the relay 27 in an operated condition, negative potential is alternately applied to the grids of the vacuum tubes 77 and 78. This maintains the tubes in an unoperated condition and consequently the alarm relay 83 is likewise in an unoperated condition, and the circuit to the alarm device open. However, when either one or both of the contacts 42 and 43 remain unoperated for a length of time, the negative charge applied to the grid of its associated tube will be given time to dissipate into the tube and leak off through the associated grid leak to ground. The tubes 77 and 78 are so adjusted that with less than a predetermined negative bias on their grids, current will be allowed to flow from the plate to the cathode. Thus the failure of the tape to rotate the roller 28 for a predetermined length of time during the operation of the reperforator allows one or both of the tubes 77 and 78 to operate and cause current to flow through the alarm relay 83. The operation of the alarm relay 83 completes the circuit to the alarm device and calls to the attention of the attendant that the reperforator is not operating properly. The relay 27 prevents the operation of the alarm device during periods of inoperation of the reperforator in exactly the same manner as described with the preferred embodiment hereinbefore. Two contacts 42 and 43, and their associated elements are employed in both embodiments of the invention so that at least one of the contacts will always be open and insure the operation of the alarm device should the tape fail to be advanced at any time.

Although this invention has been shown and described as operating in conjunction with a reperforator, it will be obvious to those skilled in the art that its use is not limited to this one particular type of telegraph machine but may be equally well adapted to operate in conjunction with a tape transmitter or a tape printer and with minor modifications such as increasing the time constants of the grid leaks of the vacuum tubes, the principles of the invention could be readily adapted to be used in conjunction with a page printer. It will also be obvious that with some sort of a snap or toggle device actuated by movement of the tape, adapted to only momentarily close a contact such as 42 or 43, only one contact and its associated equipment would be required and that with obvious minor circuit changes, grid controlled arc discharge tubes, such as Thyratrons, could be employed in place of the vacuum tubes or space discharge devices. It is desired, therefore, that only such limitations shall be placed thereon as are imposed by the prior art or are specifically set forth in the appended claims.

What is claimed is:

1. In combination, a recording medium and a recording medium advancing means adapted to normally advance said recording medium a predetermined amount on each operation of said recording medium advancing means, current controlling means, means actuated by the condition of movement of said recording medium past a predetermined part of its path of travel for operating said current controlling means, means responsive to the operation of said current controlling means including a space discharge device, a signaling means and means controlled by said space discharge device for rendering said signaling means operative on the failure of said recording medium advancing means to advance said recording medium past said predetermined part of its path of travel.

2. In combination, a recording medium and a recording medium advancing means adapted to normally advance said recording medium a predetermined amount on each operation of said recording medium advancing means, a plurality of current controlling members, means normally actuated by movement of said recording medium past a predetermined part of its path of travel for operating said current controlling members whereby never less than one is in an unoperated position at a time, a plurality of space discharge paths controlled by said current controlling members, a signaling device and means, controlled by each one of said space discharge paths, for rendering said signaling device operable on the failure of said recording medium advancing means to advance said recording medium past said predetermined part of its path of travel, whereby to operate said current controlling members actuating means.

3. In combination, a recording medium and a recording medium advancing means adapted to normally advance said recording medium a predetermined amount on each operation of said recording medium advancing means, a plurality of sets of current controlling members, means normally actuated by movement of said recording medium for operating said current controlling members whereby never less than one is in an unoperated position at a time, a plurality of thermionic tube grid-cathode circuits and an equal number of associated thermionic tube plate-cathode circuits controlled by said grid-cathode circuits, means controlled by said current controlling members for intermittently applying positive potential to said grid-cathode circuits to render said plate-cathode circuits operable, high resistance leak circuits in shunt relation with each of said grid-cathode circuits tending to render said grid-cathode circuits unoperable, a signaling device and means adapted to render said signaling device operative during an inoperable condition of any one of said plate-cathode circuits.

4. In combination, a recording medium and a recording medium advancing means adapted to normally advance said recording medium a predetermined amount on each operation of said recording medium advancing means, a space discharge device having an operating and non-operating condition comprising a plate, cathode and control electrode, means comprising a leak circuit in shunt relation to said control electrode tending to bias said space discharge device to one of said conditions, means controlled by movement of said recording medium for alternately and intermittently placing said space discharge device in the other of said conditions, an alarm circuit controlled by said space discharge device and means operative on the failure of said recording medium advancing means to advance said recording medium past a predetermined part of its path of travel on each operation thereof to allow said space discharge device biasing means to bias said space discharge device to said associated condition and render said alarm circuit operable.

5. In a telegraph apparatus, a recording web, a recording web advancing means, a plurality of thermionic tube relays, means controlled by the movement of said recording web on the operation of said web advancing means for maintaining said tubes in a normal condition, an alarm device normally maintained inoperative by the normal condition of all of said tubes, means operative on the failure of said web past a predetermined part of its path of travel advancing means to advance said web to operate one or more of said tubes to an off-normal condition and means controlled by one or more of said tubes in an off-normal condition for operating said alarm device.

6. In combination with a telegraph machine employing perforated tape or the like for recording or transmitting signals, means for advancing said tape, a time delay circuit having a normal and off-normal condition, means invariably tending to bias said time delay circuit to one of said conditions, means controlled by movement of said tape for intermittently placing said time delay circuit in the other of said conditions, the timing of the operation of said last mentioned means being such relative to said biasing means as to maintain said time delay circuit in said last named condition during normal operation of said tape advancing means to advance said tape, a signal circuit controlled by said time delay circuit and means operative on the failure of said tape advancing means to advance said tape past a predetermined part of its path of travel to allow said biasing means to bias said time delay circuit to its associated condition and render said signal circuit operative.

7. In combination with a telegraph machine employing perforated tape or the like for recording signals, means for advancing said tape, two pairs of cooperating contact members, means controlled by the movement of said tape for alternately operating said pairs of contact members, means controlled by the successive operation of said pairs of contact members to indicate the failure of said tape advancing means to advance said tape, said last mentioned means comprising two space discharge paths, each including a cathode, plate and control electrode, a source of current, circuits connecting said control electrodes to the respective pairs of contact members and current source, and a leak circuit in shunt relation to each of said control electrodes to restore the same to a critical potential if one or the other of said pairs of contact members is not operated within a predetermined time.

8. In combination, a recording medium and a recording medium advancing means for advancing said recording medium, a signal device for indicating predetermined undesired conditions that may arise in regard to the advancement of said recording medium by said medium advancing means, circuit controlling means, space discharge means controlled by said circuit controlling means for controlling said signal device, means automatically controlled by the condition of said recording medium for controlling said circuit controlling means and said space discharge means for causing said signal device to indicate when the condition occurs in which the advancing means is operating but no movement of the recording medium occurs past a predetermined part of its normal path of travel and means for preventing said signal device from indicating an undesired condition of the recording medium when the recording medium advancing means has stopped in the normal operation thereof.

JAMES N. ANDERSON.
ROBERT STEENECK.